US006202499B1

(12) United States Patent
Brinn (10) Patent No.: US 6,202,499 B1
(45) Date of Patent: Mar. 20, 2001

(54) AUTOMOTIVE TRANSMISSION (75) Inventor: Herbert P. Brinn, Bay City, MI (US)

(73) Assignee: Brinn, Inc., Bay City, MI (US)

( * ) Notice: Subject to any disclaimer, the term of this patent is extended or adjusted under 35 U.S.C. 154(b) by 0 days.

(21) Appl. No.: 09/428,216

(22) Filed: Oct. 27, 1999

(51) Int. Cl.$^7$ ................................................. E16H 19/00
(52) U.S. Cl. ............................................................. 74/329
(58) Field of Search ....................................... 74/329, 333

(56) References Cited

U.S. PATENT DOCUMENTS

| | | |
|---|---|---|
| 942,912 | 12/1909 | Keller . |
| 1,251,293 | 12/1917 | Schmidt . |
| 1,259,829 | 3/1918 | Brown . |
| 1,259,876 | 3/1918 | Kratz . |
| 1,943,016 | 1/1934 | Hadfield . |
| 2,001,762 | 5/1935 | Blood . |
| 2,099,813 | 11/1937 | Lansing . |
| 2,600,043 | 6/1952 | Armitage et al. . |
| 3,600,962 | 8/1971 | Ivanchich . |
| 3,921,774 | 11/1975 | Hagen . |
| 4,410,071 | 10/1983 | Osterman . |
| 4,480,734 | 11/1984 | Ishikawa et al. . |
| 4,532,821 | 8/1985 | Hagen . |
| 4,773,277 | 9/1988 | Cook et al. . |
| 5,226,339 | 7/1993 | Donato et al. . |
| 5,381,703 | 1/1995 | Rankin . |
| 5,651,288 | 7/1997 | Meeusen . |
| 5,732,595 | 3/1998 | Brookins . |
| 5,910,190 | * 6/1999 | Brookins ................................ 74/329 |

* cited by examiner

*Primary Examiner*—Dirk Wright
(74) *Attorney, Agent, or Firm*—Reising, Ethington, Barnes, Kisselle, Learman & McCulloch, P.C.

(57) ABSTRACT

An automotive transmission having a low inertia drive train has an input shaft connected directly to the vehicle engine's crankshaft. A countershaft drive gear is journaled on the input shaft and a first clutch is operable to engage the countershaft drive gear and the input shaft. A countershaft carries a driven gear, a low ratio gear, and a reverse drive gear. An output shaft carries a low ratio driven gear and a reverse driven gear. A reverse idler gear meshes with the reverse drive and driven gears. A starter is coupled to the reverse idler gear through a speed reduction drive train and a one-way clutch. Sliders are operable to couple the input shaft to the output shaft, the low ratio driven gear to the output shaft and the reverse driven gear to the output shaft.

17 Claims, 4 Drawing Sheets

AUTOMOTIVE TRANSMISSION

TECHNICAL FIELD

This invention relates to an automotive transmission and more particularly to a low inertia drive train transmission especially adapted for use in racing vehicles.

BACKGROUND OF THE INVENTION

Over a period of time the weight of racing vehicles has been reduced and engine horsepower increased. With reduced weight and increased engine power, transmissions with three or more forward gear ratios are not required, and transmissions have been modified to reduce the number of forward gear ratios.

The modified transmissions conventionally have two forward gears and one reverse gear and have improved the performance of racing vehicles. However, these modified transmissions have several objectionable characteristics. For example, their cases are larger and heavier than is required. A countershaft is driven constantly, thereby not only consuming power, but also churning the lubricant and heating the entire transmission assembly. The inertia due to the rotating parts is excessive and impedes both acceleration and deceleration.

Several proposals have been made to overcome the disadvantages described. For example, the engine flywheel has been eliminated from the drive train thereby decreasing inertia and improving acceleration as well as deceleration. However, removal of the flywheel also eliminated the starter ring gear that generally was mounted on the periphery of the flywheel.

Clutches have been added to eliminate rotation of the countershaft gearing when the transmission is shifted into direct drive. These clutches have limited useful lives, may cause lubricant leaks, and require major disassembly of the entire transmission when replacement is required.

Elimination of the flywheel and the starter ring gear precludes the use of conventional engine starting systems. In one proposal the engine starting system is provided by connecting a ring gear carrier plate to a starter, like that used in combination with a torque converter, in lieu of the flywheel. A conventional starter has a drive gear that engages the ring gear to start the engine. The added ring gear carrier and an attached ring gear become, in effect a lightweight flywheel that rotates whenever the engine is running, thereby resulting in undesirable drive train inertia.

SUMMARY OF THE INVENTION

A vehicle transmission constructed in accordance with the invention has appreciably reduced rotational inertia. It includes a countershaft driven by a wet clutch pack assembly that can be replaced without removing either the countershaft or the output shaft. The transmission includes an electric starter for the engine that cranks the engine through a gear train and clutches.

The transmission has a housing, an input shaft, an output shaft, and a countershaft. The input shaft is journaled in a bore through a clutch pack mounting plate. The forward end of the input shaft is connected directly to the crankshaft of an engine and rotates therewith. A clutch housing is journaled on the rear portion of the input shaft. A first friction surface on the clutch housing is movable into engagement with a second friction surface rotatably fixed to the input shaft by a hydraulic piston in a cylinder in the clutch mounting plate to lock the clutch housing to the input shaft. Bolts clamp the clutch mounting plate to the transmission housing with a clutch housing inside the transmission housing. A countershaft drive gear is attached to the clutch housing and is in mesh with a countershaft driven gear. A low-speed forward drive gear and a reverse drive gear are mounted on the countershaft and secured to the countershaft driven gear. An output shaft is journaled in the transmission housing coaxially with the input shaft. A reverse driven gear and a low-speed driven gear are rotatably journaled on the output shaft. The low-speed driven gear is in constant mesh with the low-speed forward drive gear. A reverse idler gear is in constant mesh with the reverse drive gear and the reverse driven gear.

A first slider is splined on the output shaft and is slideable selectively from a neutral position to a first engaged position in which the output shaft is coupled to the input shaft or to a second engaged position in which the low-speed driven gear is coupled to the output shaft. A second slider is splined on the output shaft and is axially slideable from a neutral position to a forward position in which the reverse driven gear is coupled to the output shaft.

An electric starter is mounted on the transmission housing. A starter drive gear drives the reverse idler gear through a series of reduction gears and a one-way clutch. To crank the vehicle engine, the starter motor drives the starter drive gear, the reduction gears, and the reverse idler gear. The reverse idler gear drives the countershaft gears and the countershaft drive gear attached to the clutch housing. When the hydraulic piston is pressurized to engage the clutch in the clutch housing, the engine may be cranked by the starter motor. A one-way clutch in the series of reduction gears prevents the engine from driving the starter at high speed.

BRIEF DESCRIPTION OF THE DRAWINGS

The presently preferred embodiment of the invention is disclosed in the following description and in the accompanying drawings, wherein.

DESCRIPTION OF THE PREFERRED EMBODIMENT

Figure 3:
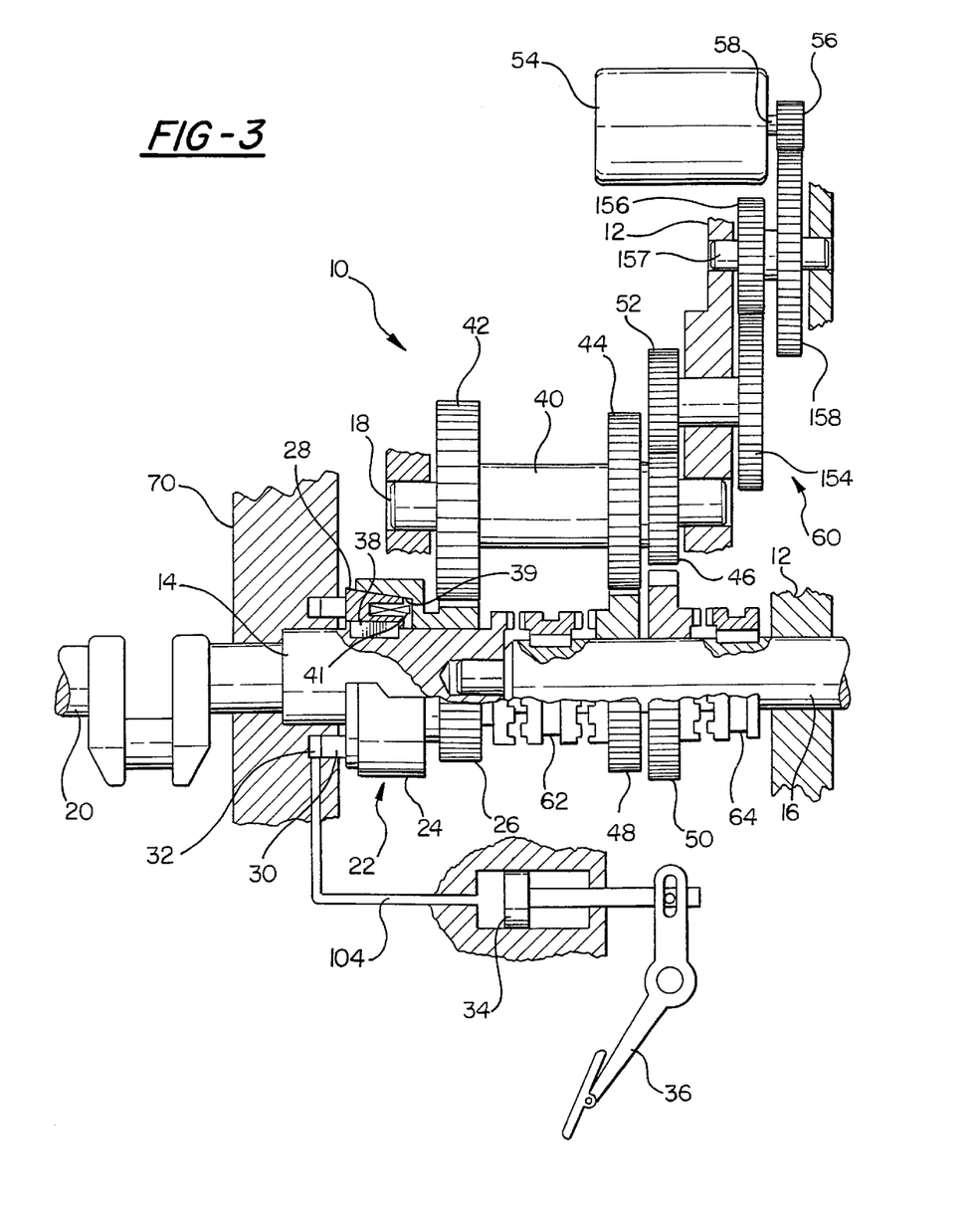
FIG. 3 is a fragmentary partly elevational and partly sectional view of the transmission and the starter drive.

A vehicle transmission having a low inertia drive train is designated generally by the reference character 10 and includes a transmission housing 12. As is best shown in FIG. 3, the housing 12 supports an input shaft 14, an output shaft 16, and a countershaft 18. The input shaft 14 is connected directly to the crankshaft 20 of an internal combustion engine. The input shaft 14 thus cannot slip relative to the crankshaft 20. The crankshaft has no flywheel, thereby reducing inertia and permitting the engine to accelerate or decelerate rapidly.

A clutch assembly 22 is mounted on the input shaft 14 and includes a clutch housing 24 through which the input shaft 14 extends. A countershaft drive gear 26 is integral with the clutch housing 24. A conical member 28 is movable to the right, as shown in FIG. 3, by a torodial piston 30 when fluid is pumped into a chamber 32 by a piston 34 and a hand or foot-operated lever 36. The member 28 is connected to the input shaft 14 by a key 38. Movement of the member 28 to the right causes the latter to engage a conical surface 39 on the clutch housing 24 and drivingly couples the countershaft drive gear 26 to the input shaft 14. A spring 41 urges the conical member 28 out of engagement with the conical surface 39 to disengage the clutch assembly 22 when force on the piston 30 is released.

A spool 40, having a countershaft driven gear 42, a forward drive gear 44, and a reverse drive gear 46, is journaled on the countershaft 18. A low ratio driven gear 48 is journaled on the output shaft 16 and is in mesh with the forward drive gear 44. A reverse driven gear 50 is also journaled on the output shaft 16. A reverse idler gear 52 is in mesh with the reverse drive gear 46 as well as the reverse driven gear 50. The position of the reverse idler gear 52 as shown in FIG. 3 is out of position by rotation about the countershaft 18 for clarity of illustration.

An electric starter motor 54 is mounted on transmission housing 12. A starter drive gear 56 is mounted on the output shaft 58 of the starter motor. A speed reduction gear train 60 (FIG. 3) is driven by the starter drive gear 56 and drives the reverse idler gear 52.

A first slider 62 is splined on the output shaft 16 and is axially slideable on the shaft. As shown in FIG. 3, the first slider 62 is in a neutral position. Moving the slider to the left from a neutral position to a first position connects the input shaft 14 directly to the output shaft 16. Moving the first slider 62 to the right and into a second position couples the low ratio driven gear 48 to the output shaft 16. A second slider 64 is also slideably splined on the output shaft 16. As shown in FIG. 3, the second slider 64 is in a neutral position. When the second slider 64 is moved axially to the left, or forward, the reverse driven gear So is engaged and coupled to the output shaft 16.

Figure 1:
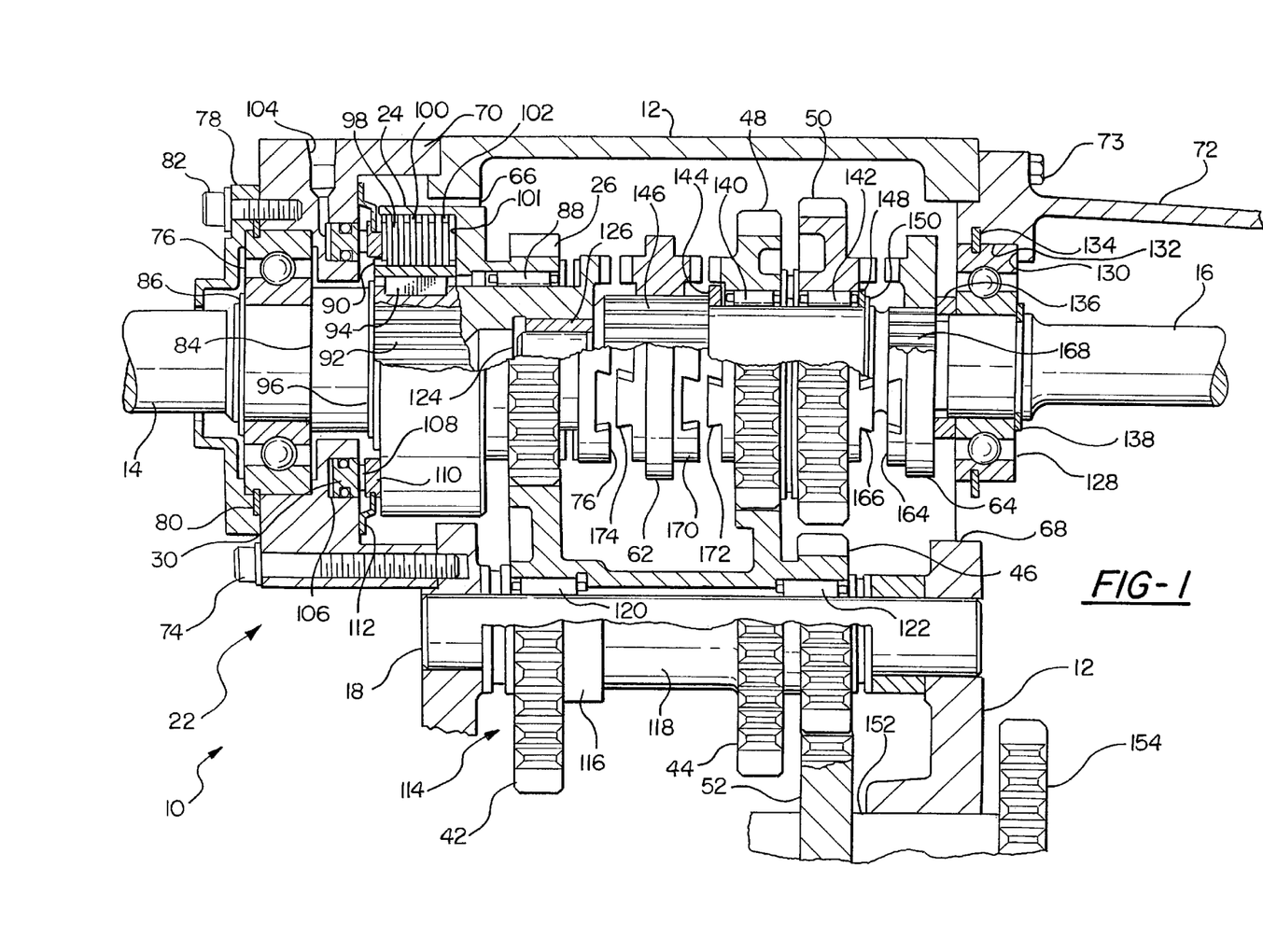
FIG. 1 is a sectional view of the transmission with the reverse idler gear rotated out of engagement with the reverse driven gear for clarity, with parts broken away and with the starter removed.
Figure 2:
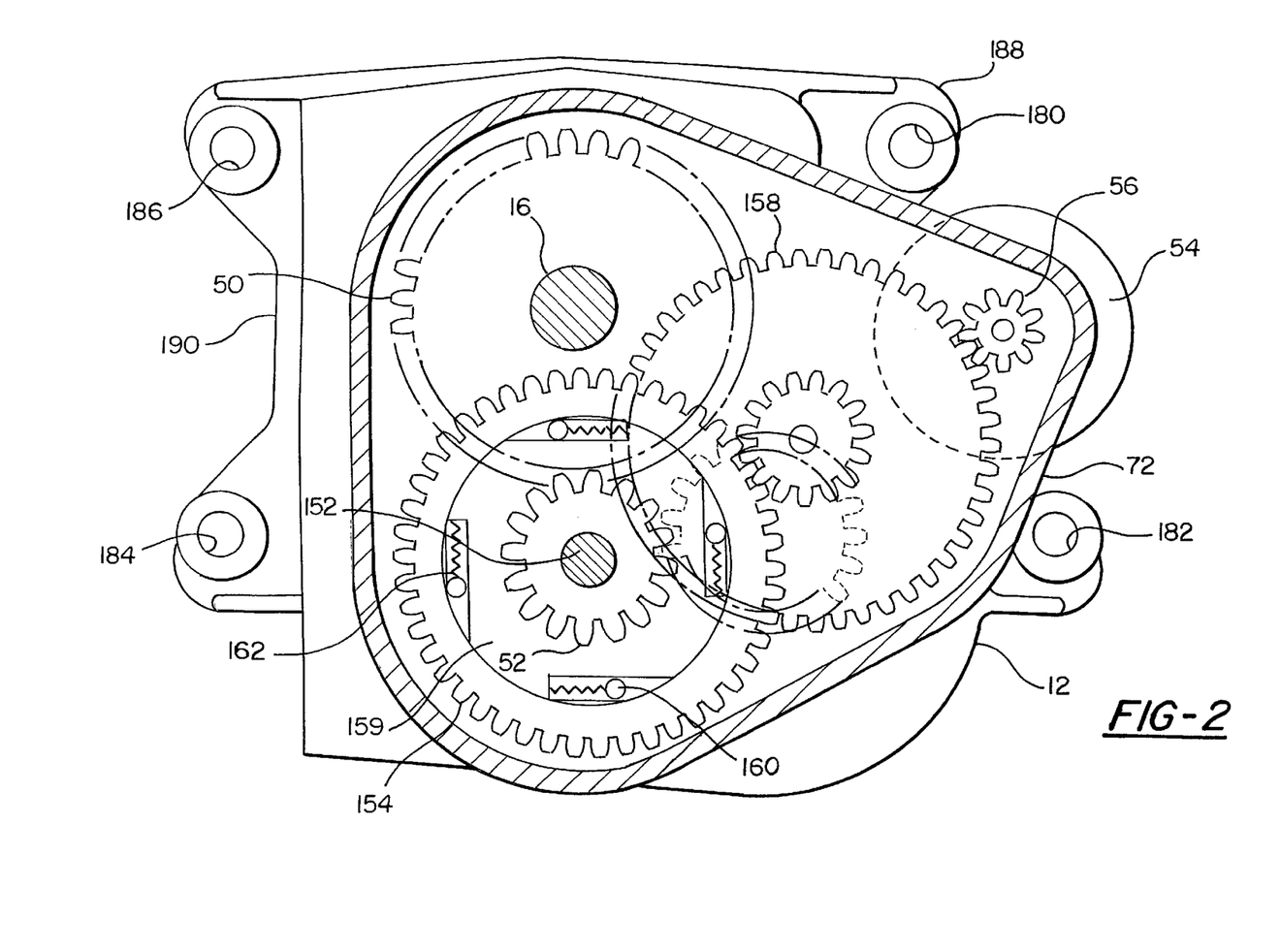
FIG. 2 is a rear sectional view of the transmission showing the starter and the starter reduction gears.

The transmission 10 is shown in more detail in FIGS. 1 and 2. The transmission housing 12 has an opening 66 for the input shaft 16, the opening being covered by a clutch pack mounting plate 70. The housing also has an output shaft opening 68 covered by an output shaft housing 72. The output shaft housing 72 as shown is a separate member attached to the transmission housing 12 by bolts 73. However, the output shaft housing 72 could be an integral part of the main housing 12 if desired.

The clutch pack mounting plate 70 is secured to the front of the transmission 12 by a plurality of bolts 74. An input shaft bearing 76 is fitted into the mounting plate 70. An axial retainer cup 78 engages a locking ring 80 and is clamped to the mounting plate 70 by bolts 82 to fix the bearing 76 axially. The input shaft 14 is fitted into the bearing 76 and is axially fixed between a shaft land 84 and a locking ring 86. A conventional shaft seal (not shown) effects a seal between the input shaft 14 and the retainer cup 78. A clutch housing 24 is journaled on the input shaft 14 by suitable rotatable bearings 88. A clutch disc carrier 90 with splines 92 is fixed to the input shaft 14 by keys 94 and a lock ring 96. A plurality of clutch discs 98 with radially inner teeth engage the splines 92 and rotate with the input shaft 14. A plurality of separator plates 100 are placed between the clutch discs 98 and have radially outer teeth that engage splines 102 in the clutch housing 24. These separator plates 100 rotate with the clutch housing 24. An internal radially extending surface 101 on the clutch housing 24 limits axial movement of the separator plates 100 and the clutch discs 98 to the rear and toward the output shaft 16.

A torodial piston 30 is mounted in a cylinder 106 in the clutch pack mounting plate 70.

A thrust bearing 108 and a thrust ring 110 are provided between the torodial piston 30 and the clutch discs 98 and separator plates 100. A spring member 112 urges the thrust ring 110 away from the clutch discs 98. A countershaft drive gear 26 is an integral part of the clutch housing 24. Manual movement of the lever 36, shown in FIG. 3, advances the piston 34, forces fluid through the passage 104 and moves the piston 30 toward the clutch discs 98 and the separator plates 100. Compression of the clutch discs 98 and the separator plates 100 couples the countershaft drive gear 26 to the input shaft 14. Release of fluid from the cylinder 106 releases compression forces on the clutch discs 98 and the separator plates 100 and frees the countershaft drive gear 26 to rotate relative to the input shaft.

The clutch assembly 22 with clutch discs 98 and separator plates 100 has a large friction surface area, but low drag and minimal inertia when disengaged.

The entire clutch assembly 22 is mounted on the clutch pack mounting plate 70. This permits removal of the clutch assembly 22 merely by disconnecting a line to the fluid passage 104, removing the bolts 74 and sliding the input shaft 14 from the transmission housing 12. Following servicing or repairing of the clutch assembly 22, the transmission 10 can be reassembled quickly. The output shaft 16 and the countershaft 18 can remain in place in the transmission housing 12 during disassembly and reassembly of the clutch assembly.

The countershaft assembly 114, as shown in FIG. 1, includes a fixed countershaft 18 mounted in the transmission housing 12 and having a countershaft axis that is parallel to and spaced from the axis of the input shaft 14. A cluster gear 116, with a central tube 118, an integral countershaft driven gear 42, an integral forward drive gear 44 and an integral reverse drive gear 46 is rotatably mounted on the countershaft 18 by bearings 120 and 122.

The transmission output shaft 16 has a forward cylindrical portion 124 journaled in a bushing 126 in a bore in the rear end of the input shaft 14. The output shaft 16 is also journaled in a bearing 128. The bearing 128, as shown in FIG. 1, is axially fixed by the bottom 130 of the bore 132 in the output shaft housing 72 and a retainer 134.

A washer 136 and a lock ring 138 axially fix the output shaft 16 in the bearing 128.

The low ratio driven gear 48 is rotatably mounted on the output shaft by a bearing 140. Reverse driven gear 50 is rotatably mounted on the output shaft 16 by a bearing 142. A washer 144 abuts a large diameter splined section 146 of the output shaft 16 and limits axial movement of the low ratio driven gear 48 and the reverse driven gear 50 toward the input shaft 14. A flat washer 148 and a lock ring 150 limit axial movement of driven gears 48 and 50 away from the input shaft 14.

A reverse idler gear 52 is fixed to an idler gear shaft 152 journaled in at least one wall of the housing 12. This reverse idler gear 52 is in mesh with the reverse driving gear 46 and the driven gear 50. As shown in FIGS. 1 and 3, the idler gear shaft 152 has been rotated out of position about the axis of the countershaft 18 and away from the reverse driven gear 50 to show more clearly the idler gear 52.

A large diameter starter driven gear 154 is mounted on the shaft 152 for rotation in one direction relative thereto. The starter driven gear 154 meshes with a small diameter starter driven gear 156 journaled on an idler shaft 157. A large diameter starter driven gear 158 is journaled on the idler shaft 157 and connected to the gear 156. The gear 158 is in mesh with the starter drive gear 56 on the starter output shaft 58. The starter speed reduction gear drive train 60 includes the gears 154, 156, and 158. The gear 154 includes a one-way clutch 159 of conventional construction. As shown in FIG. 2 the clutch 159 has pins 160 and compression springs 162. The one-way clutch 159 transmits torque from the starter 54 to crank the internal combustion engine. However, the one-way clutch 159 will not transmit torque from the engine to the starter 54 when the engine is running.

The starter 54 transmits torque to the crankshaft 20 through the starter drive gear 56, the speed reduction gear train 60, the reverse idler gear 52, the reverse drive gear 46, the countershaft driven gear 42, the countershaft drive gear 26, the clutch assembly 22 when the clutch is engaged, and the input shaft 14. The starter 54 can also drive the output shaft 16 in reverse by moving the second slider 64 axially forward on the output shaft splines 168 to lock the reverse driven gear 50 to the output shaft and running the starter with the clutch assembly 22 disengaged. Teeth 164 on the slider 64 engage teeth 166 on the reverse driven gear 50 to lock the reverse driven gear to the output shaft 16. The starter 54 can also drive the output shaft 16 in a forward direction by moving the first slider 62 on the splines 146 to move teeth 170 into engagement with teeth 172 on the low ratio driven gear and running the starter 54 with the second slider 64 in a neutral position and the clutch assembly 22 disengaged. The transmission is shifted into a straight-through drive mode by shifting the first slider 62 forward on the splines 146 until the teeth 174 engage teeth 176 on the input shaft 14 and couple the input shaft to the output shaft 16.

Conventional shift rails, shift yokes and a shift lever (not shown) are provided to effect shifting of the first and second sliders 62 and 64 in a manner well known in the art. At least one of the sliders 62 or 64 is in a neutral position at all times. The clutch assembly 22 is normally disengaged when the first slider 62 locks the input shaft 14 to the output shaft 16. However, the clutch assembly 22 can be engaged to increase drive train inertia if desired. When the first slider 62 couples the input shaft 14 to the output shaft 16 and the clutch assembly 22 is disengaged, the only parts of the transmission 10 driven by the crankshaft 20 are the input shaft, the clutch disc carrier 90, the clutch discs 98, the sliders 62 and 64, and the output shaft 16.

Sliders like those shown at 62 and 64 are used in constant mesh transmissions. The sliders 62 and 64 may be equipped with synchronizers if desired, but since such synchronizers would increase the weight of the sliders 62 and 64 and the inertia in the drive train, such synchronizers generally are undesirable in the transmission described above. Additional gears could be added to the countershaft 18 and the output shaft 16 to provide additional forward gear ratios if desired. To make room for gears required to provide additional gear ratios, the lengths of the gear case 12, the output shaft 16, and the countershaft 18 can be increased.

Bores 180, 182, 184, and 186 are provided through bosses or flanges 188 and 190 on the forward portion of the transmission housing 12 as shown in FIG. 3. Bolts (not shown) pass through the bores 180–186 to clamp the transmission to an engine via a bell housing and to align the input shaft 14 with the crankshaft 20.

Figure 4:
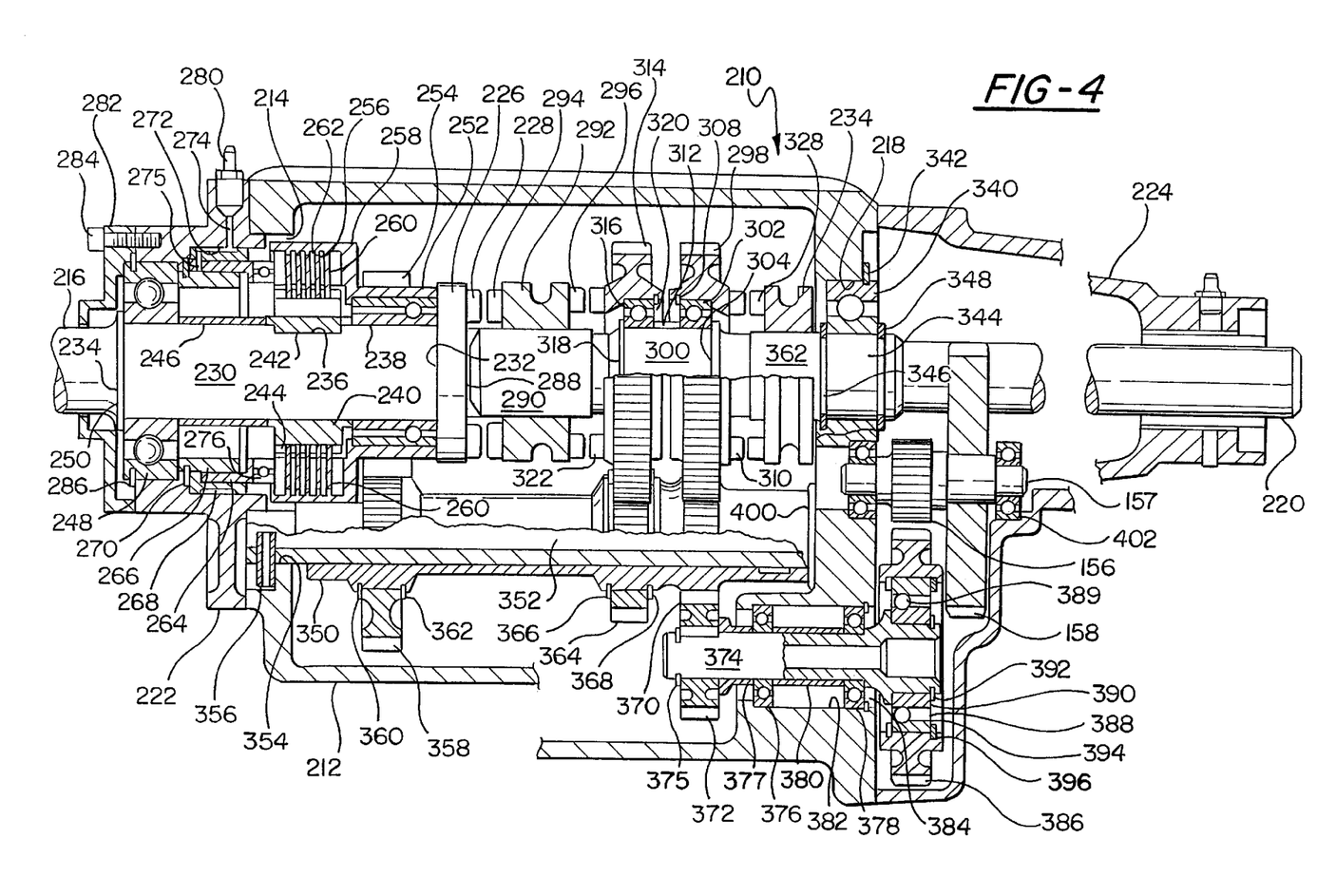
FIG. 4 is a sectional view, similar to FIG. 1, showing a modified version of the transmission with parts broken away.

A modified version of the transmission 210 is shown in FIG. 4. The construction of the transmission 210 is somewhat different than the transmission 10 shown in FIGS. 1 and 2 but the function corresponds.

The transmission 210 has a transmission case 212 with a front opening 214 for an input shaft 216 and a rear opening 218 for an output shaft 220. A clutch pack mounting plate 222 covers the front opening 214. An output shaft housing 224 covers the rear opening 218.

The input shaft 216 has a forward end (not shown) that connects directly to an internal combustion crankshaft like the input shaft 14 shown in FIG. 3. A flange 226 is integral with the rear end of the input shaft 216. A plurality of teeth 228 are integral with the flange 226 and extend axially rearward from the flange 226. A large diameter cylindrical section 230 of the input shaft 214 extends forwardly, from a front wall 232 of the flange 226, to a lock ring groove 234. One or more key ways 236 are circumferentially spaced about the cylindrical section 230.

A bearing 238 is fitted on the large diameter cylindrical section 230 of the input shaft 216 and abuts the front wall 232 of the flange 226. The bearing 238 as shown is a combination roller bearing and ball bearing. A clutch disc carrier 240 is fitted on the cylindrical section 230 and abuts the bearing 238. Keys 242 in the key ways 236 prevent the clutch disc carrier 240 from rotating relative to the input shaft 216. Splines 244 extend radially outward on the outer periphery of the clutch disc carrier 240.

A spacer sleeve 246 slides onto the cylindrical section 230 and abuts the clutch disc carrier 240. A bearing 248 is fitted on the cylindrical section 230 of the input shaft 216 and abuts the spacer sleeve 246. A snap ring 250 is inserted into the snap ring groove 234 and axially fixes the bearing 238, the clutch disc carrier 240, the spacer 246 and the bearing 248 on the cylindrical section 230 of the input shaft 216.

A clutch housing 252 is fitted on the bearing 238 and is rotatable relative to the input shaft 216. A countershaft drive gear 254 is mounted on or integral with an outer surface of the clutch housing adjacent to the flange 226. Clutch housing splines 256 extend radially inward on a front portion 258 of a clutch housing 252. A plurality of clutch discs 260 are mounted on the clutch disc carrier 240 with their radially inner teeth in engagement with the splines 244. Separator plates 262 are mounted in the front portion 258 of the clutch housing 252 with their radially outer teeth in engagement with the clutch housing splines 256.

Each of the clutch discs 260 is positioned between two separator plates 262. The clutch discs 260 are locked to the clutch disc carrier 240 and rotate with the input shaft 216. The separator plates 262 are locked to the clutch housing 252 and rotate with the clutch housing.

A tubular piston 264 is mounted between an inner tubular member 266 and an outer tubular member 68. A snap ring 270 holds the inner tubular member 266 in a fixed position relative to the outer tubular member 268. The outer tubular member 268, as shown, is secured in a bore 272 in the clutch mounting plate 222. Fluid under pressure in the gallery 274 passes through passages 275 through the outer tubular member 268 and moves the tubular piston 264 toward the flange 226. This movement of the piston 264 clamps the clutch discs 260 and the separator plates 262 between a thrust bearing 276 and the wall 278 of the clutch housing 252 and locks the countershaft drive gear 254 to the input shaft 216. The valve 280 is an air bleed valve for bleeding air from the gallery 274. Hydraulic fluid is forced into and released from the gallery 274 by an available source of hydraulic fluid and any required valves connected to the gallery.

The outer tubular member 268 can be an integral part of the clutch mounting plate 222, if desired, and the snap ring 270 can be eliminated. When the tubular member 268 is an integral part of the mounting plate 222, the inner tubular member 266 can be provided with a radially extending outer flange that is fixed between the outer race of the bearing 248 and the bottom of the bore in the clutch mounting plate 222 that receives the bearing outer race.

The clutch pack mounting plate 222 is secured to the transmission case 212 by bolts like the bolts 74 shown in FIG. 1. A retainer cup 282 is secured to the clutch pack mounting plate 222 by bolts 284. A lock ring 286 is clamped between the clutch pack mounting plate 222 and the retainer cup 282 to axially fix the position of the bearing 248. Oil seals, gaskets, and O-rings are employed as required to prevent leaks. The piston 264 can also be moved to compress the clutch discs 260 and the separator plates 262 by compressed gas if desired. The entire input shaft 216, clutch pack mounting plate 222, clutch housing, countershaft drive gear 254 and related parts can be removed from the transmission case 212 as one complete assembly.

The output shaft 220 has a front cylindrical portion 288 that extends into a bushing in a bore in the input shaft 216 like the cylindrical portion 144 extends into a bushing 126 as explained above and shown in FIG. 1. The cylindrical portion 288 of the output shaft 220 is journaled in the bore in the input shaft 216 thereby permitting rotation of the input shaft relative to the output shaft and limiting radial deflection of the input shaft and the output shaft. Output shaft forward splined portion 290 receives a first slider 292. The first slider 292 is axially slideable on the forward splined portion 290 and rotates with the output shaft 220. Teeth 294 and 296 are carried by the first slider 292.

A reverse driven gear 298 is journaled on a larger diameter cylindrical portion 300 of the output shaft 220 by a bearing 302. The bearing 302 abuts a radially extending stop surface 304 that faces toward the input shaft 216. A snap ring 308 holds the reverse driven gear 298 on the bearing 302. Teeth 310 extend axially to the rear from the reverse driven gear 298. A spacer sleeve 312 abuts the front side of the bearing 302. A low ratio driven gear 314 is journaled on the cylindrical portion 300 by a bearing 316. The bearing 316 is fitted on the cylindrical portion 300 and abuts the spacer sleeve 312. A snap ring 318 fixed the position of both bearings 302 and 316 on the cylindrical portion 300 of the output shaft 220. A snap ring 320 holds the low ratio driven gear 314 on the bearing 316. Teeth 322 extend axially forward from the gear 314.

A reverse drive slider 234 is axially slideable on the rear spline portion 362 and rotates with the output shaft 220. Teeth 328 on the reverse drive slider 234 extend axially forward from the reverse drive slider.

A bearing 340 is fitted in the rear opening 218 of the transmission case 212 and is held in place by a retainer 342. A rear cylindrical portion 344 of the output shaft 220 is fitted in the bearing 340 and locked in place by a front snap ring 346 and a rear snap ring 348.

The countershaft assembly includes a cluster gear tube 350 journaled on a fixed shaft 352. The fixed shaft 352 has its ends supported in a bore 354 in the front and rear walls of the transmission case 212. A roll pin 356 in the fixed shaft 352 prevents the fixed shaft from rotating in the bore 354. A countershaft driven gear 358 is keyed to the cluster gear tube 350 and axially fixed between snap rings 360 and 362. The driven gear 358 is in constant mesh with the countershaft drive gear 254. A low ratio drive gear 364 is also keyed to the cluster gear tube 350 and axially fixed between snap rings 366 and 368. The low ratio drive gear 364 is in constant mesh with the low ratio driven gear 314.

A reverse drive gear 370 is integral with the cluster gear tube 350. However, the reverse drive gear 370 is not in mesh with the reverse driven gear 298. A reverse idler gear 372 is keyed to an idler shaft 374 and axially fixed on the idler shaft by a snap ring 375 and a spacer sleeve 377. The idler shaft 374 is fitted in bearings 376 and 378. A sleeve 380 separates the two bearings 376 and 378 which are fitted in a bore 382. A snap ring 384 prevents axial movement of the bearings 376 and 378 and holds the bearing adjacent to the idler gear 372 in contact with an end of the bore 382.

A starter driven gear 386 is connected to the idler shaft 374 by a one-way clutch 388. The one-way clutch 388 includes balls 389 that permit rotation of the idler shaft 374 relative to the starter driven gear 386 in one direction and that lock and transmit torque from the starter driven gear to the idler shaft in the opposite direction. A inner race 390 of the one-way clutch 388 is fixed to the reverse idler shaft 374 outside the transmission case 212, by a snap ring 392. An outer race 394 of the one-way clutch 388 is fixed to the starter driven gear 386 and axially retrained by two snap rings 396. The one-way clutch 388 is a known one-way clutch and is one of a number of one-way clutches that could be employed.

The positions of the reverse idler gear 372 and the idler shaft 374 have been rotated about the axis of the fixed shaft 352 and out of mesh with the reverse driven gear 298 for clarity. The shifting of the idler shaft 374 to the position shown in FIG. 4 also moves the starter driven gear 386 out of mesh with the starter driven gear 156. The reverse idler gear 372 is in mesh with the reverse driven gear 298 and the reverse drive gear 370. The starter driven gear 386 is in mesh with the starter driven gear 156. Starter driven gear 156 is fixed to an idler shaft 157 rotatably supported in the output shaft housing 224 by bearings 400 and 402. Starter driven gear 158 is also fixed to the idler shaft 157. Starter driven gears 156 and 158 are identical to gears with the same reference numbers shown in FIGS. 1 and 2 and described above. The starter driven gear 158 is driven by starter drive gear 56 as described above.

The transmission 210 drives the output shaft 220 in reverse when the input shaft 216 is driven by an internal combustion engine, fluid under pressure is directed to the gallery 274 thereby moving the piston 264 to the rear and compressing the clutch discs 260 and the separator plates 262 and the reverse drive slider 364 is moved forward to move teeth 328 into engagement with teeth 310. This transmits torque from the input shaft 216 through the clutch disc 260, the separator plates 262, the countershaft drive gear 254, the countershaft driven gear 358, the reverse drive gear 370, the reverse idler gear 372, the reverse driven gear 298 and the reverse slider 234, to the output shaft 220.

The transmission 210 drives the output shaft 220 forward at a low speed when the input shaft 216 is driven by an internal combustion engine, the gallery 274 is pressurized to engage the disc clutch 260 with the separator plates 262, the first slider 292 is moved to the rear and the teeth 296 engage teeth 322. In this mode torque is transmitted from the input shaft 216 through the clutch disc 260, the separator plates 262, the countershaft drive gear 254, the countershaft driven gear 358, the low ratio drive gear 364, the low ratio driven gear 314, and the first slider 292, to the output shaft 220.

The transmission 210 drives the output shaft 220 forward at a high speed when the gallery 274 is unpressurized and the first slider 292 is moved forward and the teeth 294 engage the teeth 228. In this mode torque is transmitted from the input shaft 216 through the teeth 228, the teeth 294 and the first slider 292 to the output shaft 220.

The disclosed embodiments are representative of presently preferred forms of the invention, but are intended to be illustrative rather than definitive thereof. The invention is defined in the claims.

I claim:

1. An automotive transmission having a low inertia drive train comprising: a transmission housing having an input shaft opening and an output shaft opening; a clutch pack mounting plate fastened to the transmission housing by mechanical fasteners and covering the input shaft opening; an input shaft journaled in a bore through the clutch pack mounting plate, axially fixed to the clutch pack mounting plate, rotatable about an input shaft axis, and having a first end adapted to be connected to the crankshaft of an internal combustion engine and a second end that extends into the transmission housing; a clutch assembly including a clutch housing rotatably journaled on the input shaft, a first friction surface rotatably fixed to the clutch housing, a second friction surface rotatably fixed to the input shaft, a hydraulic piston in a cylinder in the clutch pack mounting plate that is axially movable relative to the input shaft axis to move the first friction surface and the second friction surface into engagement and lock the clutch housing to the input shaft; a hydraulic passage connecting the cylinder in the clutch pack mounting plate to a source of hydraulic fluid; a countershaft drive gear fixed to the clutch housing; a countershaft journaled in the transmission housing for rotation about a countershaft axis that is parallel to and spaced from the input shaft axis; a countershaft driven gear mounted on the countershaft and in mesh with the countershaft drive gear; at least one forward drive gear mounted on the countershaft and fixed to the countershaft driven gear; a reverse drive gear mounted on the countershaft and fixed to the countershaft driven gear; an output shaft coaxial with the input shaft, journaled in the transmission housing, and passing through the output shaft opening; at least one low ratio driven gear rotatably journaled on the output shaft and in mesh with the forward drive gear on the countershaft; a reverse driven gear rotatably journaled on the output shaft; a first slider mounted on the output shaft and axially slideable on the output shaft between a first position in which the output shaft is locked to the input shaft, a neutral position and a second position in which the at least one low ratio driven gear is locked to the output shaft; a second slider mounted on the output shaft and axially slideable between a disengaged position and a reverse drive position in which the reverse driven gear is locked to the output shaft; and a reverse idler gear journaled on the transmission housing and in mesh with the reverse drive gear and the reverse driven gear.

2. The transmission set forth in claim 1 including an electric starter mounted on the housing and connected to the reverse idler gear by a speed reduction gear train.

3. The transmission set forth in claim 2 including a one-way clutch connected to the speed reduction gear train for transmitting torque from the starter to the reverse idler gear and preventing the transmission of torque from the reverse idler gear to the starter.

4. The transmission set forth in claim 1 including a manually movable piston mounted in a master cylinder that is connected to the cylinder in the clutch pack and operable to supply hydraulic fluid to the clutch pack and engage the clutch assembly.

5. The transmission set forth in claim 1 wherein the first friction surface is a first conical surface and the second friction surface is a second conical surface.

6. The transmission set forth in claim 1 wherein said first friction surface comprises a pair of axially facing surfaces on each of a plurality of separator plates; and said second friction surface comprises a pair of axially facing surfaces on each of a plurality of clutch discs each of which is between a pair of the separator plates.

7. An automotive transmission having a low inertia drive train comprising: a transmission housing; an input shaft rotatably journaled in said housing for rotation about an input shaft axis; an output shaft rotatably journaled in said housing and coaxial with the input shaft; a countershaft rotatably journaled in said housing for rotation about a countershaft axis parallel to and spaced from the input shaft axis; a countershaft drive gear mounted on the input shaft; a countershaft driven gear mounted on the countershaft and in mesh with the countershaft drive gear; first clutch means operable to transmit torque between the input shaft and the countershaft when engaged; a reverse drive gear mounted on the countershaft; a reverse driven gear rotatably journaled on the output shaft; a slider mounted on the output shaft and movable between a position in which the reverse driven gear is locked to the output shaft and a position in which the reverse driven gear is free to rotate relative to the output shaft; a reverse idler gear mounted in said housing and in mesh with the reverse drive gear and the reverse driven gear; starter means having a starter drive gear mounted on a starter output shaft; a speed reduction gear train for transmitting torque between the starter drive gear and the reverse idler gear; and a one-way clutch in the speed reduction gear train for preventing the transmission of torque from the reverse idler gear to the starter.

8. The transmission set forth in claim 7 wherein the reverse idler gear is secured to a reverse idler gear shaft journaled in the housing and wherein the speed reduction gear train includes a drive gear mounted on the reverse idler gear shaft for transmitting torque to the reverse idler gear.

9. The transmission set forth in claim 8 wherein the drive gear mounted on the reverse idler gear shaft includes the one-way clutch.

10. The transmission set forth in claim 7 wherein the countershaft drive gear is journaled on the input shaft and the first clutch means locks the countershaft drive gear to the input shaft when engaged.

11. An automotive transmission having a low inertia drive train comprising a transmission housing; an input shaft journaled in said housing and being connectable directly to an engine crankshaft; a clutch housing journaled on the input shaft; a first clutch assembly for locking the clutch housing to the input shaft; a countershaft drive gear coupled to the clutch housing; a countershaft journaled in said transmission housing; a countershaft driven gear mounted on the countershaft and in mesh with the countershaft drive gear; at least one low ratio drive gear mounted on the countershaft and fixed to the countershaft driven gear; a reverse drive gear mounted on the countershaft; an output shaft journaled in said transmission housing; a low ratio driven forward gear journaled on the output shaft and in mesh with the low ratio drive gear; a reverse driven gear journaled on the output shaft; a reverse idler gear journaled in said transmission housing and in mesh with the reverse drive gear and the reverse driven gear; a first slider mounted on the output shaft and being slideable from a neutral position to a forward position in which the input shaft is locked to the output shaft and being slideable to a rear position in which the low ratio driven forward gear is locked to the output shaft; a second slider mounted on the output shaft and being slideable between a neutral position and a position in which the reverse driven gear is locked to the output shaft; a starter motor mounted on said transmission housing; and a speed reduction gear train having a one-way clutch for transmitting torque from the starter to the reverse idler gear and preventing the transmission of torque from the reverse idler gear to the starter.

12. An automotive transmission having a low inertia drive train comprising: a transmission housing having an input shaft opening and an output shaft opening; a clutch pack mounting plate carried on the transmission housing and covering the input shaft opening; an input shaft journaled in a bore through the clutch pack mounting plate for rotation about an input shaft axis, said input shaft having a first end adapted to be connected to an engine crankshaft and a second end extending into the transmission housing; a clutch assembly including a clutch housing rotatably journaled on the input shaft, a first friction surface rotatably fixed to the clutch housing, a second friction surface rotatably fixed to the input shaft, a hydraulic piston in a cylinder on the clutch pack mounting plate axially movable relative to the input shaft axis to move the first friction surface and the second friction surface into engagement and lock the clutch housing to the input shaft; a fluid passage connecting the cylinder on the clutch pack mounting plate to a source of pressurized fluid; a countershaft drive gear fixed to the clutch housing; a countershaft journaled in the transmission housing for rotation about a countershaft axis that is parallel to and spaced from the input shaft axis; a countershaft driven gear mounted on the countershaft and in mesh with the countershaft drive gear; and an output shaft coaxial with the input shaft journaled in the transmission housing and passing through the output shaft opening.

13. An automotive transmission comprising: an input shaft; means for connecting said input shaft to an engine crankshaft; an output shaft coaxial with said input shaft; a countershaft parallel to said input shaft; a countershaft drive gear journaled on said input shaft and in mesh with a countershaft driven gear on said countershaft; at least one low ratio forward drive gear driven by the countershaft driven gear; a reverse driven gear journaled on said output shaft and driven by a reverse drive gear; a multi-disc clutch having a first plurality of discs locked to said input shaft and a second plurality of discs locked to the countershaft drive gear; a plurality of sliders operable to couple said input shaft to said output shaft for straight through drive, to couple at least one low ratio driven gear to said output shaft, and to couple the reverse driven gear to said output shaft, wherein when in straight through drive said output shaft is coupled to said input shaft, the first plurality of discs locked to said input shaft are driven by said input shaft, and said output shaft and the plurality of sliders are driven by said input shaft, and wherein the second plurality of discs are disabled from transmitting torque from said input shaft, the at least one low ratio forward drive gear is disabled from transmitting torque from said input shaft, and the reverse drive gear is disabled from transmitting torque from said input shaft.

14. A starter drive train for cranking an internal combustion engine having a crankshaft comprising: a transmission housing; a starter motor supported by said housing; a speed reduction gear drive train coupled to and driven by the starter motor; a countershaft drive gear coupled to and driven by the speed reduction gear drive train; a countershaft having a countershaft driven gear in mesh with the countershaft drive gear; an input shaft journaled in said transmission housing and in said countershaft drive gear; a clutch engagable to transmit torque between the countershaft driven gear and the input shaft; and means for coupling the input shaft to the crankshaft of said internal combustion engine.

15. A starter drive train as set forth in claim 14 including a one-way clutch in the speed reduction gear train.

16. An automotive transmission comprising a housing; an input shaft extending into and journaled in said housing; an output shaft independent of said input shaft journaled in said housing and extending outward thereof; a countershaft independent of said input and output shafts and journaled in said housing; first clutch means for selectively coupling and uncoupling said countershaft to and from said input shaft; shiftable coupling means operable selectively to couple and uncouple said input shaft to said output shaft, the uncoupling of said first clutch means from said input shaft following coupling of said input shaft to said output shaft via said coupling means enabling rotation of said output shaft by said input shaft and disabling rotation of said countershaft; a starter motor; and unidirectional clutch means coupling said motor to said countershaft for rotating the latter in response to energization of said motor, said starter motor being operable when energized to rotate said input shaft via said first clutch means when the latter couples said countershaft to said input shaft.

17. An automotive transmission comprising a housing; an input shaft; means journaling said input shaft for rotation; an output shaft independent of said input shaft journaled in said housing and extending outward thereof; a countershaft independent of said input and output shafts and journaled in said housing; first clutch means for selectively coupling and uncoupling said countershaft to and from said input shaft; and shiftable coupling means operable selectively to couple and uncouple said input shaft to and from said output shaft, the uncoupling of said first clutch means from said input shaft following coupling of said input shaft to said output shaft via said coupling means enabling rotation of said output shaft by said input shaft and disabling rotation of said countershaft, said input shaft and said first clutch means constituting an input shaft assembly movable to and removable from said housing while the countershaft and the output shaft remain journaled in said housing.

\* \* \* \* \*